United States Patent [19]

Magnin et al.

[11] Patent Number: 5,928,977
[45] Date of Patent: Jul. 27, 1999

[54] ZIRCONIA BASED CERAMIC ARTICLE AS WEAR-RESISTANT EXTERIOR PART FOR WRISTWATCH

[75] Inventors: Pierre Magnin, Cugy; Béatrice Michel, Montet sur Cudrefin, both of Switzerland

[73] Assignee: SMH Management Services AG, Biel, Switzerland

[21] Appl. No.: 08/988,428

[22] Filed: Dec. 10, 1997

[30] Foreign Application Priority Data

Dec. 23, 1996 [EP] European Pat. Off. .............. 96120856

[51] Int. Cl.$^6$ .................... C04B 35/48; C04B 35/486; C04B 41/80

[52] U.S. Cl. .................... 501/87; 501/103; 428/404; 428/698; 427/215; 427/569; 427/577

[58] Field of Search .................... 501/87, 103, 104, 501/105; 428/404, 698, 570, 938; 427/215, 249, 569, 577, 580, 585

[56] References Cited

U.S. PATENT DOCUMENTS

| | | | |
|---|---|---|---|
| 3,900,592 | 8/1975 | Kennedy et al. | 427/580 |
| 4,447,501 | 5/1984 | Shigeru et al. | 427/215 |
| 4,781,989 | 11/1988 | Yoshimura et al. | 428/552 |
| 5,298,333 | 3/1994 | Maixner et al. | 428/698 |
| 5,549,976 | 8/1996 | Abiven et al. | 428/608 |

FOREIGN PATENT DOCUMENTS 38 12 428 10/1989 Germany .

OTHER PUBLICATIONS

Patent AbstractS of Japan vol. 014, No. 431 (C–0759), Sep. 17, 1990 & JP 02 167875 A (Toray IND Inc), Jun. 28, 1990 & Database WPI Week 9032 AN 90–242230 & JP 92 167 875.

Database WPI Week 8348 Derwent Publications Ltd., London, GB; AN 83–830509 XP002031841 & JP 58 181 766 A (Toray), Oct. 24, 1983.

Database WPI Week 8230 Derwent Publications Ltd., London, GB; AN 82–62489e XP002031842 & JP 57 098 671 A (Suwa Seikosha), Jun. 18, 1982.

Applied Surface Science, vol. 31, –31 Dec. 1988 Amsterdam, NL, pp. 471–476, XP002031840 D.L. Cocke et al.

*Primary Examiner*—Michael Marcheschi
*Attorney, Agent, or Firm*—Griffin, Butler, Whisenhunt & Szipl, LLP

[57] ABSTRACT

The invention concerns a zirconia based ceramic article having a core of $ZrO_2$ and/or partially reduced $ZrO_2$, characteriZed in that it includes, over at least part of its surface, a superficial layer integral with said article, the thickness of said superficial layer including a plurality of regions of which one external region is formed of zirconium carbide having a metallic appearance.

10 Claims, 3 Drawing Sheets

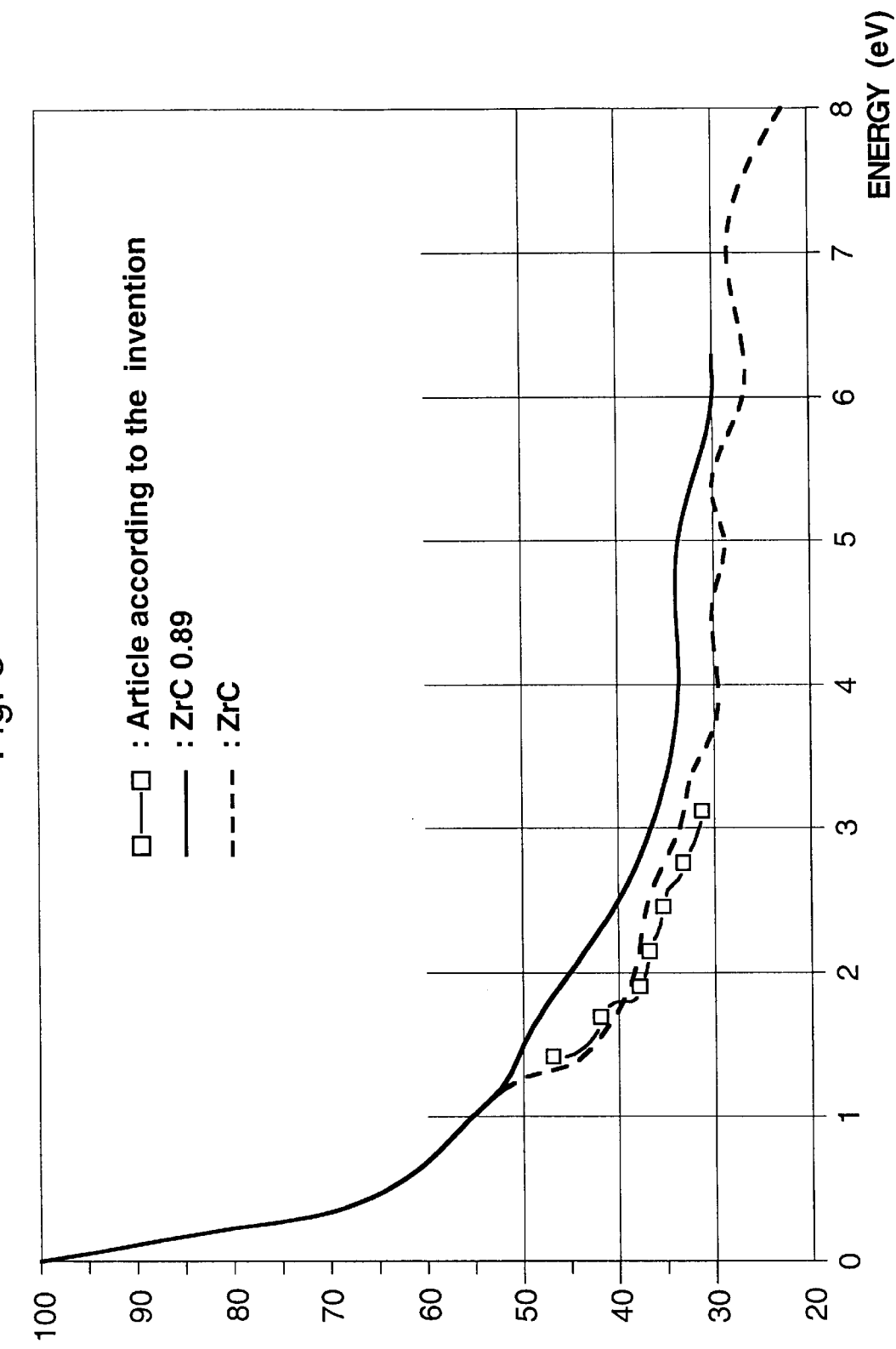

ZIRCONIA BASED CERAMIC ARTICLE AS WEAR-RESISTANT EXTERIOR PART FOR WRISTWATCH

The present invention concerns a zirconia based ceramic article, particularly a sintered article, and in particular an article of this type whose chemical structure is transformed over part of its thickness to give such article an external surface having a metallic appearance. The invention also concerns a use of such an article, as an exterior part for a wristwatch, in particular for making construction parts for watch cases or wristbands. The present invention concerns finally a method for obtaining such an article.

BACKGROUND OF THE INVENTION

Among all known materials, metals are very widely used because of certain advantageous properties: high level of mechanical resistance, high level of toughness, formability, electrical conductivity, etc. Moreover, their characteristic brilliance or lustre is very much sought after for decorative applications. Their hardness is however inferior to that of ceramics, which may result in significant wear in numerous common conditions of use, for example when these materials are used to make exterior parts used in watchmaking, such as watch cases or wristbands.

For this reason, it has long been a goal to increase the hardness of metals. The conventional metallurgic methods (quenching, structural hardening) do not however enable the very high levels of hardnesses, i.e. greater than 1,000 HV (Vickers hardness) required for certain applications, such as cutting tools or scratchproof decorative parts.

For these applications, the hardness of metals has been increased by adding very hard particles, i.e. by making two-phase composites formed of a metallic phase coating hard particles, which frequently take up most of the volume of the material. A certain number of materials of this type have been developed and are today commonly used in the industry. They are generally called "hard metals" when the hard particles used are for example tungsten carbide, and "cermet" when they are made of aceramic material, for example titanium carbonitride.

All these materials have in common however the fact that they include a distinct metallic phase which may limit their resistance to corrosion and their mechanical properties at high temperatures.

Moreover, the metallic phase used as binding agent usually contains nickel or cobalt, all attempts to substitute other metals for these elements having led to insatifactory results until now. However, the use of this metallic phase with nickel and cobalt, in applications which result in prolonged contact with the skin, such as for example for watchmaking and jewellery applications, must be avoided since these elements are known to frequently cause allergies.

Finally, these materials are generally difficult to manufacture, which constitutes a significant limitation for the manufacture of exterior parts for watchmaking or pieces of jewellery which often have complex shapes with resultant high cost.

Patent Document JP-A-02 167875 discloses a method for producing modified zirconia ceramics ($ZrO_2$) for the purpose of changing the hardness of the latter and also giving thereto a black or grey-black colour. In order to do this, it is proposed to place a previously heated zirconia ceramic part into a reaction vessel in which plasma is generated, preferably, a microwave plasma from mixture of gases including hydrogen and a hydrocarbon gas or carbon monoxide so that the superficial layer of the ceramic material is converted into a form of zirconium carbide (ZrC) of black or grey-black appearance. The ceramic material thus modified is then used for making cutting tools, and machine parts.

SUMMARY OF THE INVENTION

An object of the invention is thus to overcome the drawbacks of the prior art by providing a zirconia based ceramic article, in particular a sintered article, having all the advantageous properties of conventional ceramic parts (hardness, shapeability, lack of allergenic effect, etc.) while having the brilliance or lustre of metal parts.

Another object of the present invention is to use in an advantageous manner certain properties of the zirconium carbide obtained by converting the zirconia at the surface of a part for aesthetic and decorative purposes when used in the watchmaking industry.

Another object of the present invention is to provide a method for obtaining such a zirconia based ceramic article which may easily be industrialised and which allows these articles to be obtained at cycle rates and costs compatible with market requirements.

The invention thus concerns a zirconia based ceramic article having a $ZrO_2$ and/or partially reduced $ZrO_2$ core characterised in that it includes, over at least part of its surface, a superficial layer integral with said article, the thickness of said superficial layer including a plurality of regions of which one external region is formed of zirconium carbide having a metallic brilliance.

According to a preferred feature of the article of the invention, the superficial layer includes a transition region situated between the core and the external region, said transition region including sub-stoichiometric zirconium carbide and zirconium oxycarbides.

It is to be noted therefore that the chemical composition of the superficial layer varies as a function of the depth measured from the surface of the exterior part and passes continuously, i.e. without interruption of continuity, from stoichiometric zirconium carbide (ZrC) to a transition region including sub-stoichiometric zirconium carbide and zirconium oxycarbides.

According to another preferred feature of the invention, the carbon content of the sub-stoichiometric zirconium carbide in the transition region decreases with the depth while the oxygen content of the oxycarbides increases with the depth.

The transition region thus includes sub-stoichiometric zirconium carbide whose carbon content gradually decreases as one progresses towards the core of the article whereas its oxygen content progressively increases in the form of zirconium oxycarbide ($ZrO_xC_y$) type compounds, to progressively reach the core of the article which is essentially formed of partially reduced zirconia of the $ZrO_{2-x}$ type and/or zirconia ($ZrO_2$). It will of course be understood that the transition between these various regions happens gradually, the quantity of a compound of an upper region decreasing in favour of a compound of a lower layer.

Chemical analysis of the superficial layer by RBS-ERDA measuring techniques has demonstrated the relative concentrations of zirconium, carbon and oxygen corresponding to the aforecited chemical compounds as a function of the depth from the surface of the article.

The invention also concerns a method for obtaining a finished or semi-finished zirconia ceramic article having a ZrO2 and/or partially reduced ZrO2 core, having an metallic external appearance, characterised in that it includes the following steps consisting of:

providing at least one zirconia ceramic article previously shaped into its finished or semi-finished shape;

placing said article in an reaction vessel in which a plasma obtained from a mixture of hydrogen, an inert gas and traces of carbon is generated; and maintaining said article in the plasma for a period of time of approximately 15 to 240 minutes, the average temperature of the article being in these conditions between approximately 600 and 1,300° C.

In order to make such articles, one has started by making, in accordance with conventional techniques, a part in conventional zirconia ceramics having all the required properties, but with no metallic features. This part was then subjected to the method according to the invention in order to transform the crystallographic structure of its surface thereby forming a superficial layer including, in particular, an external region formed of zirconium carbide.

The external region of the superficial layer of the zirconia exterior part transformed according to the method of the invention thus gives such part the optical characteristics of a zirconium carbide of metallic appearance.

Grazing X ray diffraction analysis has shown that the structure of the superficial layer transformed at the surface has the crystallographic structure corresponding to that of zirconium carbide.

Standard X ray diffraction analysis has shown that the crystallographic structure of the core of the part corresponds to that of tetragonal zirconia.

The articles obtained via this method acquire certain new properties, in particular electrical conductivity and a metallic brilliance or lustre while keeping the properties of ceramics, in particular their very high level of hardness.

Quite unlike known "hard metals" and "cermets", the zirconia ceramic articles of the invention do not contain any metallic phase.

The invention also concerns the use of a ceramic material having a ZrO2 and/or partially reduced ZrO2 core as a wear resistant exterior part for a wristwatch, such part including, over at least part of its surface, a superficial layer integral with said part, the thickness of said superficial layer including a plurality of regions of which one external region is formed of zirconium carbide having a metallic brilliance.

Other features and advantages of the invention will be better understood hereinafter with the aid of the following description of an embodiment example of a zirconia ceramic article having an metallic external appearance and the method for obtaining such article according to the invention, given solely by way of illustrative example and made with reference to the annexed drawings, in which:

BRIEF DESCRIPTION OF THE DRAWINGS

FIG. 3 shows two reflection spectrum respectively of a zirconium carbide and a sub-stoichiometric zirconium carbide given by way of reference and measuring points effected on an article according to the invention.

DESCRIPTION OF PREFERRED EMBODIMENTS

Figure 1:
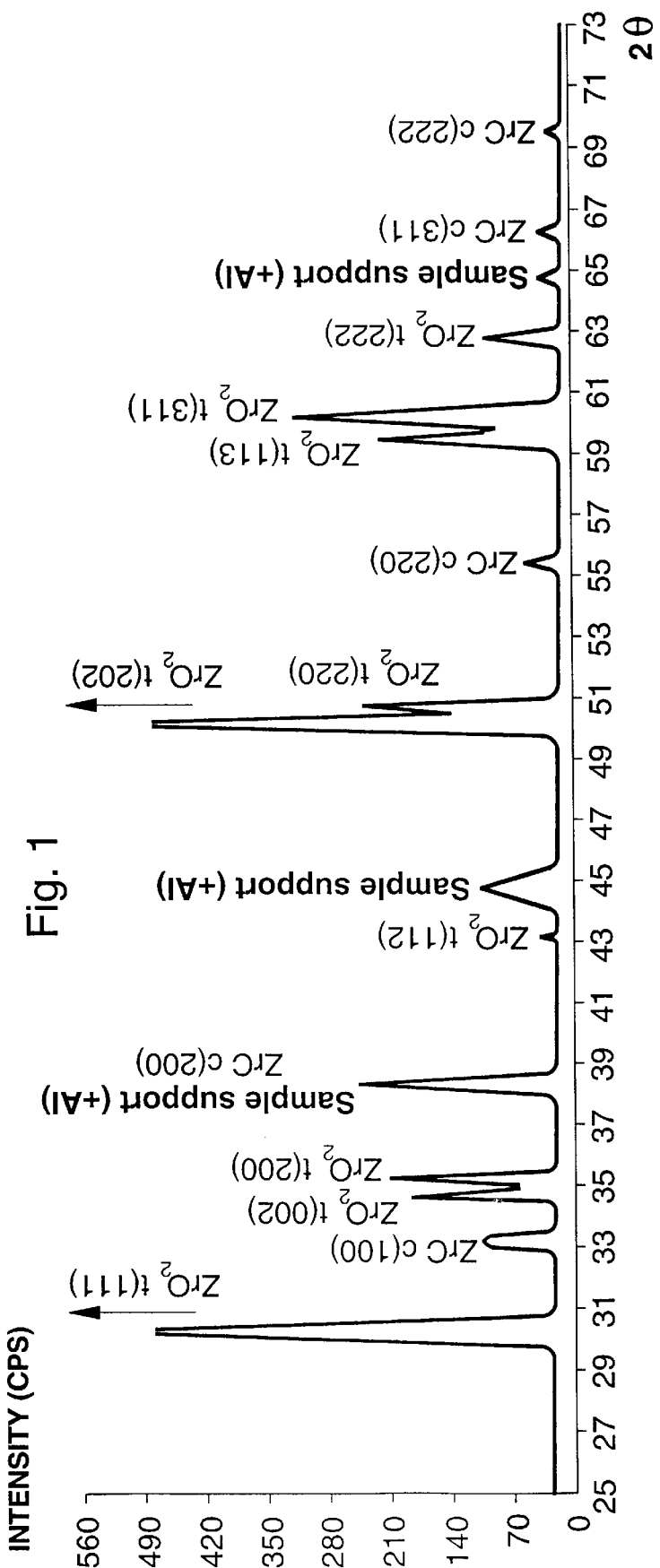
FIGS. 1 and 2 are respectively grazing (surface structure) and standard (core structure) X-ray diffraction spectrum measured on an article according to the invention.

By way of example, one provides an article made of zirconia having a tetragonal crystallographic configuration (zirconium oxide, ZrO2), white in colour and which is made according to conventional manufacturing techniques for ceramic articles, for example by sintering.

This article may be a finished product having the final shape in which it will be used, for example a part of generally parallelepiped shape already mirror polished and intended to form an exterior part of a wristwatch, for example a wristband link.

Of course, if necessary, the article may be a semi-finished product on which subsequent machining operations will be performed in order to adapt such article to its final use.

This article is then placed into a reaction vessel in which a plasma is generated from ionisation of a mixture of hydrogen, an inert gas and traces of carbon. This plasma is generated for example by electric discharges.

According to the method used to generate the plasma, the use of argon as inert gas is advantageous.

The traces of carbon used to generate the plasma may be obtained from hydrocarbon gases such as methane, acetylene, ethane or a mixture of these latter. Care should be taken however that during the process, the relative concentrations of the different components of the plasma are not such that diamond is formed at the surface of the article.

The article is maintained in the plasma during a period of time from 15 to 240 minutes and preferably of 150 minutes. The average temperature of the article during treatment of the latter varies from 600 to 1.300° C. according to the parameters (time, composition of the gaseous mixture, flow rates, etc . . . ) of the process.

After this latter operation, the article has the metallic brilliance or lustre of zirconium carbide while maintaining a very high level of superficial hardness indispensable for obtaining a wear resistant article in normal conditions of use.

An essential point of the method is that it concerns a transformation of the article over a small thickness, of the order of 300 to 1,000 nm, the zirconia (zirconium oxide) in the external region being converted into zirconium carbide having a metallic brilliance. It therefore concerns a superficial conversion of the structure of the zirconia into a new crystallographic structure corresponding to that of zirconium carbide and not an added coating layer liable to be torn off or become detached from the surface of the article, in particular when the latter is subjected to significant wear conditions.

More particularly, the external region of the superficial layer which has the zirconium carbide structure extend from the surface of the article over a depth of between 20 and 150 nm.

The transition region situated between the core of the article and the external region includes sub-stoichiometric zirconium carbide of the $ZrC_{1-y}$ type. The sub-stoichiometry of the zirconium carbide increases progressively (the carbon content decreasing) towards the core of the article while from a certain depth, an increasing quantity of oxygen appears progressively in the form of zirconium oxycarbide.

The core of the article is then reached, said core essentially being formed of partially reduced zirconia of the $ZrO_{2-x}$ type and/or zirconia ZrO2.

The method according to the invention thus modifies not only the surface but also the core of the article or a part of such core—which is converted or transformed into $ZrO_{2-x}$—according to the dimensions of the article, such core then having a grey colour. Consequently, slight scratches on the surface of the article do not result in visible marks on the article.

The hydrocarbon gases which are added in small quantity to the mixture of hydrogen and inert gas and which are used to generate the plasma result in a relatively short treatment time, of the order of 150 minutes and to better repeatability of the method. This makes the method according to the invention amenable to industrial applications.

Figure 2:
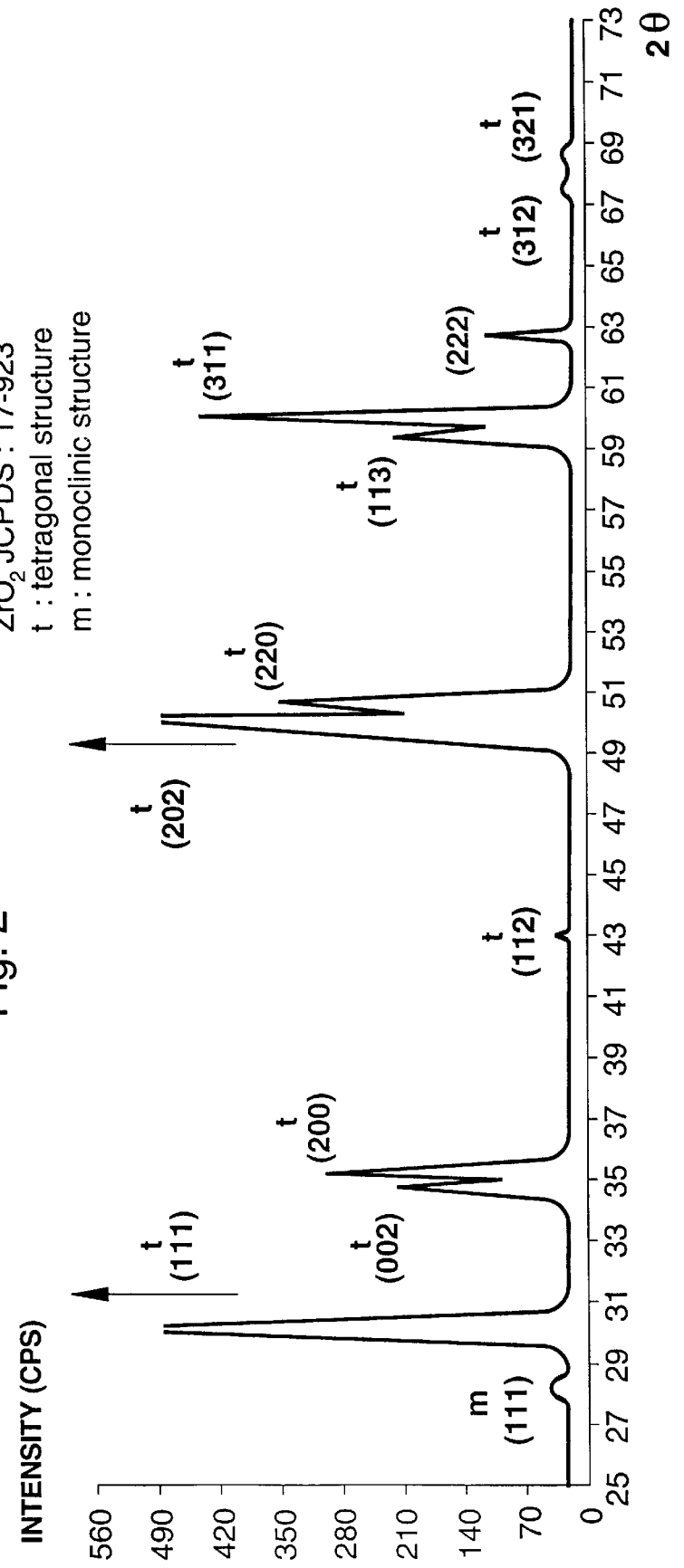

The structure of the superficial layer of the zirconia ceramic article transformed at the surface has been shown by the diffraction spectrum obtained with grazing X-rays while the structure of the core has been shown by standard X-ray diffraction techniques. In these spectrum, visible in FIGS. 1 and 2 respectively, the characteristic peaks of zirconium carbide and zirconia are recognisable.

Referring now to FIG. 3, curves illustrating the light reflection, in the visible wavelength band, at the surface of an article, made respectively of zirconium carbide and of sub-stoichiometric zirconium carbide, namely of $ZrC_{0.89}$ are shown. These two curves are drawn from the article "Electrical Properties of Single Crystalline Zirconium Carbide" by F. A. Modine, T. H. Haywood and C. Y. Allison published in the "Physical Review B", volume 32 of Dec. 15, 1985, page 7744 (FIG. 3). Results of similar measurements made on an article of the invention have been incorporated in the form of discreet measuring points in the Figure, from which it is clearly seen that the reflection spectrum of the articles according to the invention indeed corresponds to that of a layer of stoichiometric or slightly sub-stoichiometric ZrC (FIG. 3).

The Applicant has also performed electrical resistivity measurements on the superficial layer of the article of the invention. These measurements have resulted in resistivity values of the order of 250 $\mu\Omega$cm. These values are comparable to those given in the scientific literature for substantially stoichiometric zirconium carbide ZrC. The Applicant has referred to the article by V. A. Petrov et al., published in the review "High Temperatures—High Pressures" in 1981, volume 13, page 770 for these resistivity values.

It is clear from the above that the method according to the invention allows articles, in particular decorative articles of metallic appearance, combining certain of the properties of ceramics and metals, to be achieved.

It is thus possible to obtain decorative articles of great level of hardness, having a particularly aesthetic appearance and metallic brilliance, easily able to be shaped and not liable to cause allergic reactions with the wearer's skin. Consequently, these articles are perfectly suited to use as decorative articles and in particular as construction parts for bracelets and/or cases for timepieces such as wristwatch.

What is claimed is:

1. A wear-resistant exterior wristwatch part formed from a zirconia based ceramic material having a core made of $ZrO_2$ and/or partially reduced $ZrO_2$, wherein the surface of said part comprises a superficial layer integral with said part, the thickness of said superficial layer including an external region formed of zirconium carbide having a metallic brilliance.

2. The wristwatch part of claim 1, wherein the superficial layer includes a transition region situated between the core and the external region, said transition region including sub-stoichiometric zirconium carbide and zirconium oxycarbides.

3. The wristwatch part of claim 2, wherein the sub-stoichiometric zirconium carbide in the transition region has a carbon content, said carbon content decreasing when one progresses towards the core of the ceramic material, while the oxygen content of the oxycarbides increases when one progresses toward the core of the ceramic material.

4. The wristwatch part of claim 1, wherein the thickness of the superficial layer is between approximately 300 and 1,000 nm.

5. The wristwatch part of claim 1, wherein the thickness of the external region of zirconium carbide is approximately between 20 and 150 nm.

6. A method for producing a finished or semi-finished zirconia based ceramic article having a core of $ZrO_2$ and/or partially reduced $ZrO_2$, the article having a metallic external appearance, wherein the method consists of:

providing at least one zirconia ceramic article previously shaped into a finished or semi-finished shape;

placing said article in a reaction vessel in which a plasma is generated from a mixture of hydrogen, an inert gas, and traces of carbon; and maintaining said article in the plasma for a period of time of approximately 15 to 240 minutes at a temperature between 600 and 1,300° C. in order to convert a portion of the $ZrO_2$ to zirconium carbide, wherein the zirconium carbide forms an external region.

7. The method of claim 6, wherein the inert gas is argon.

8. The method of claim 6, wherein the traces of carbon are obtained from at least one hydrocarbon gas injected into said vessel, the hydrocarbon gas being selected from methane, acetylene, ethane, and mixtures thereof.

9. The method of claim 7, wherein the traces of carbon are obtained from at least one hydrocarbon gas injected into said vessel, the hydrocarbon gas being selected from the group consisting of methane, acetylene, ethane, and mixtures thereof.

10. A wear-resistant exterior wristwatch part formed from a zirconia based ceramic material having a core made of $ZrO_2$ and/or partially reduced $ZrO_2$, wherein the surface of said part comprises a superficial layer having a thickness between approximately 300 and 1,000 nm and being integral with said part, said thickness of said superficial layer including an external region having a thickness between approximately 20 and 150 nm and being formed of zirconium carbide having a metallic brilliance.

* * * * *